United States Patent [19]

Hamilton

[11] Patent Number: 5,216,749
[45] Date of Patent: Jun. 1, 1993

[54] CORE PREDICTIONS FOR QUALITATIVE PHYSICS

[75] Inventor: Thomas P. Hamilton, South Windsor, Conn.

[73] Assignee: United Technologies Corporation, Hartford, Conn.

[21] Appl. No.: 832,614

[22] Filed: Feb. 12, 1992

Related U.S. Application Data

[63] Continuation of Ser. No. 549,580, Jul. 6, 1990, abandoned.

[51] Int. Cl.$^5$ ............................................. G06F 15/00
[52] U.S. Cl. ...................................... 395/10; 395/911; 395/912; 395/913; 364/551.02
[58] Field of Search .................. 395/10, 912, 913, 914, 395/911, 915; 364/550, 551.01, 551.02

[56] References Cited

U.S. PATENT DOCUMENTS 4,939,680 7/1990 Yoshida .............................. 364/513

OTHER PUBLICATIONS

The Handbook of Artificial Intelligence; Barr et al; vol. IV; Chapter XXI: Qualitative Physics; pp. 325–413; Dec. 1989.
An Application of Qualitative Reasoning to Process Diagnosis: Automatic rule generation by qualitative simulation, Y. Ishida, pp. 124–129.

Primary Examiner—Allen R. MacDonald
Attorney, Agent, or Firm—Evenson, Wands, Edwards, Lenahan & McKeown

[57] ABSTRACT

The value of an unknown variable associated with a particular hypothesis is determined by iteratively setting the variable to each of its possible values and, for each iteration, propagating the known variables and the value of the unknown variable through confluences of the model. If only one value for the unknown variable results in a consistent set of predictions for the hypothesis, the unknown variable is set to that value. If no variables result in a consistent set of predictions, then the hypothesis is deemed to be invalid.

2 Claims, 10 Drawing Sheets

CORE PREDICTIONS FOR QUALITATIVE PHYSICS

This is a continuation of application Ser. No. 07/549,580, filed Jul. 6, 1990, now abandoned.

TECHNICAL FIELD

This invention relates to the field of computer software and more particularly to the field of artificial intelligence computer software.

BACKGROUND ART

It is often the case that the symptoms of a machine failure indicate a number of alternative explanations. Usually it is more cost effective and less time consuming to observe the machine in more detail in order to rule out some of the alternative explanations. The process of iteratively observing the machine and ruling out potential causes of machine failure is called "failure isolation".

Failure isolation can be performed manually with the aid of a fault tree, a flowchart-like representation of the iterative observation/elimination steps of failure isolation. Each element of the fault tree requests a user to make a particular observation. Extending from each element is a plurality of branch paths, each of which leads to a different portion of the fault tree. The user follows a particular branch path based on the results of the observation requested by the current element. At some point in the process, the user will reach an element, having no branches extending therefrom, indicating the particular component or group of components which has failed.

For very large and complex machines, a fault tree can run on to many pages and perhaps to multiple volumes, thereby rendering the fault tree difficult to traverse One solution is to use a computer having therein a rule-based failure isolation system, a program that contains the information from the fault tree. The computer directs the user to make observations and enter the results.

However, for both a fault tree and for a rule-base failure isolation system, all of the possible failure modes which a user may encounter need to be determined at the time of creation. While this may not be difficult for simple machines, it may be impossible or at least extremely impractical for more complex machines. It is not uncommon for either a fault tree designer or a rule-based failure isolation system programmer to omit some of the failure modes of a machine. This omission is either inadvertent due to the enormity of the task or is an intentional decision to maintain the size below a practical limit.

A solution to the inability of either fault trees or rule-based failure isolation systems to isolate every conceivable failure can be found in Davis, Randall "Diagnostic Reasoning Based on Structure and Behavior", *Artificial Intelligence*, 24 (1984), 347–410. Davis proposes a failure isolation approach called "constraint suspension", wherein a computer generates a plurality of models of the machine. Each of the models assumes a different failed component or group of failed components. The model which most closely resembles the observations of the user indicates which component or group of components have failed.

A drawback to the constraint suspension technique is that modeling complex machines having many analog quantities is very processor intensive and the amount of time it takes to run the system becomes prohibitive. A solution to this is found in a paper, "HELIX: A Helicopter Diagnostic System Based on Qualitative Physics", Hamilton, Thomas P., International Journal of Artificial Intelligence in Engineering, Vol. 3, No. Jul. 3, 1988, pp 141–150. Hamilton suggests coupling constraint suspension with qualitative physics, a modeling technique wherein analog quantities are represented as variables which can take on a finite set of values. Each of the finite qualitative values represents a different range of the analog quantity. However, the Hamilton paper does not contain sufficient detail to enable one skilled in the art to make and use a qualitative physics failure isolation system.

DISCLOSURE OF INVENTION

Objects of the invention include predicting values for variables of qualitative physics hypotheses and eliminating inconsistent hypotheses.

According to the present invention, all possible values for an unknown variable associated with a qualitative physics hypothesis are iteratively propagated through confluences of the hypothesis in order to determine if the hypothesis can be eliminated because there are no values which result in a consistent set of predictions or if the variable can be set to a single value which results in a consistent set of predictions.

The foregoing and other objects, features and advantages of the present invention will become more apparent in light of the following detailed description of exemplary embodiments thereof, as illustrated in the accompanying drawings.

BEST MODE FOR CARRYING OUT THE INVENTION

Figure 1:
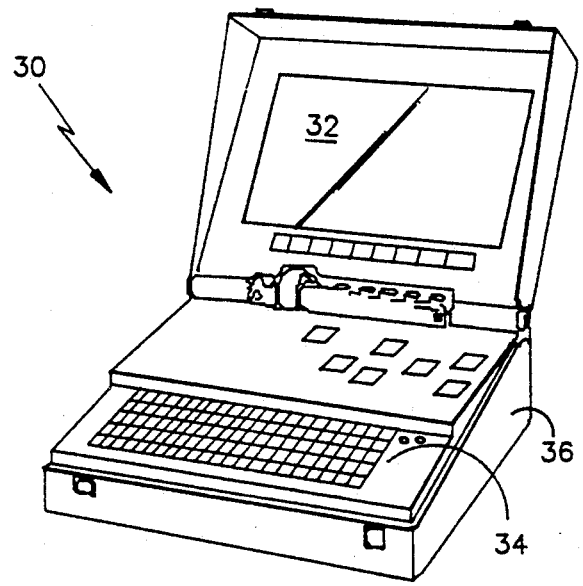
FIG. 1 is a perspective view of a Portable Maintenance Aid.

Referring to FIG. 1, a PMA (Portable Maintenance Aid) 30 has a display 32, a keyboard 34, and a processing unit 36. The PMA 30 is a portable computer manufactured by Grumman Electronic Systems Division of Bethpage N.Y., part #A31U18031-3. The display 32 is a seven inch by nine inch LCD (Liquid Crystal Display). The keyboard 34 is a QWERTY keyboard. The processing unit 36 contains a Sparcstation IE circuit board, manufactured by Sun Microsystems, Inc. of Mountain View, Calif.

The PMA 30 is used to perform failure isolation of a machine, such as a helicopter electro-mechanical system. Failure isolation software, which is written in Common Lisp, is stored on a hard disk (not shown) located within the processing unit 36. The software allows the PMA 30 to interact with a user in order to perform machine failure isolation. The software uses the display 32 to prompt the user to make observations of the machine. The user enters the results of those observations via the keyboard 34.

Figure 2:
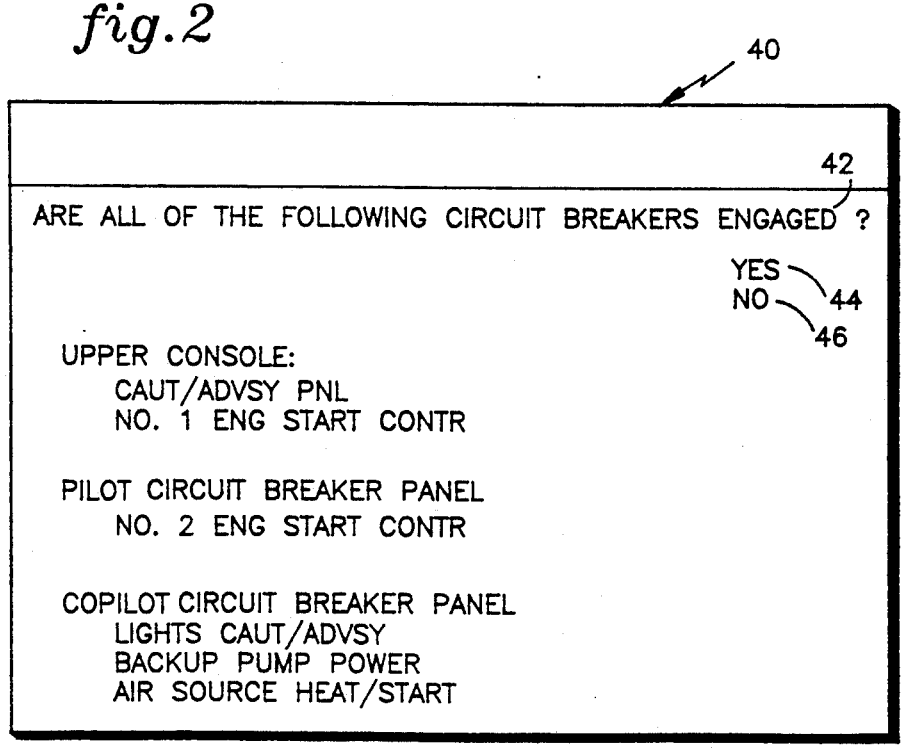
FIG. 2 illustrates a user prompt screen.

FIG. 2 illustrates a user prompt screen 40. The user is presented with a question 42 and a list of possible answers 44, 46. The question 42 used for this example requires a yes/no answer so the list of possible answers shown on the screen 40 contains just "YES" 44 or "NO" 46. The user employs the cursor keys to select one of the answers 44, 46 and then presses the return key to indicate to the software that an answer has been selected. Other user prompt screens may require the user to measure and enter a particular value.

Figure 3:
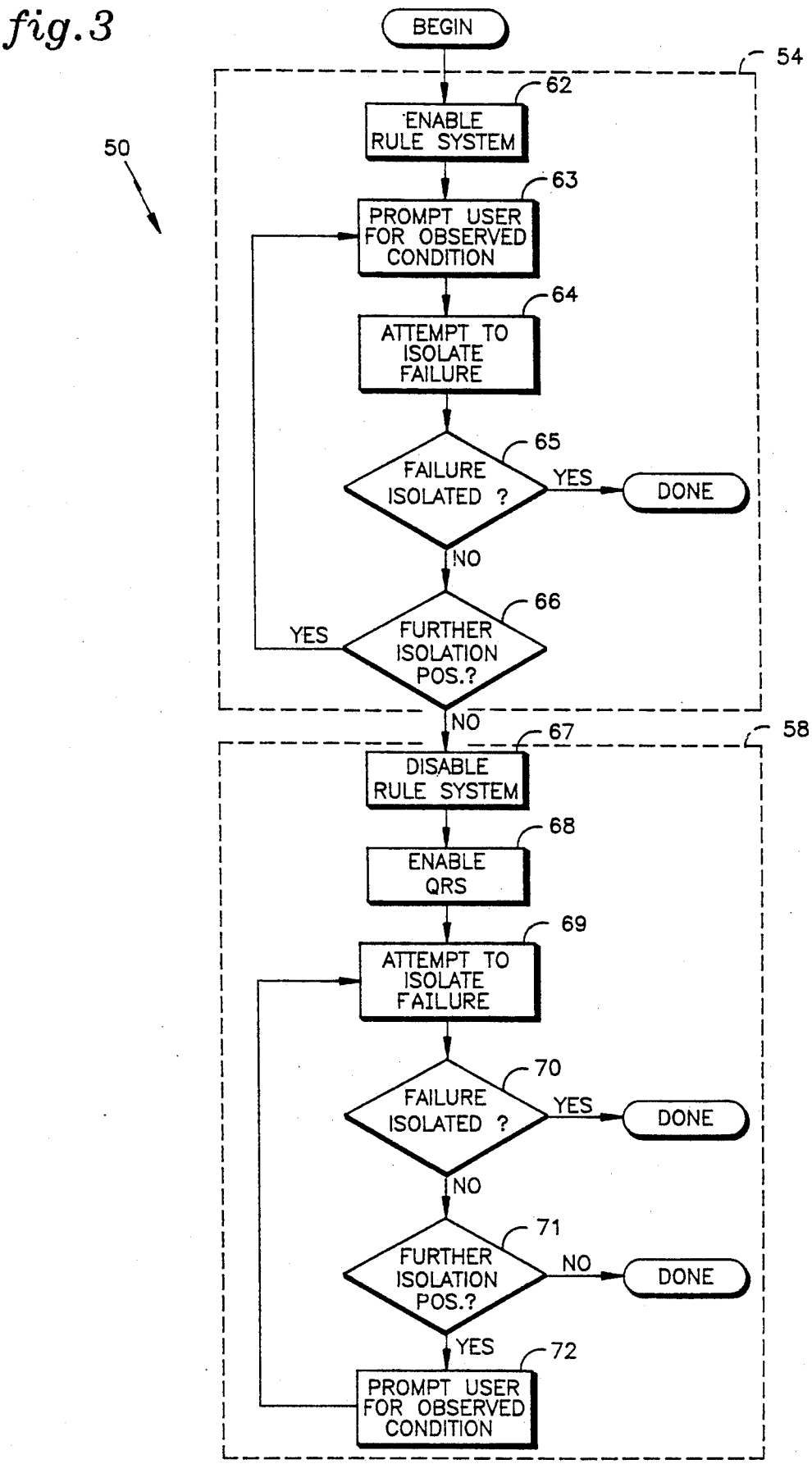
FIG. 3 is a flowchart which illustrates overall operation of failure isolation software.

FIG. 3, a flowchart 50 which illustrates operation of the failure isolation software, is separated into steps 54 for a rule-based system and steps 58 for a QRS (Qualitative Reasoning System). The steps 54 for the rule-based system, the implementation and operation of which is known to those skilled in the art (see for example *Building Expert Systems*, Frederick Hayes-Roth, Donald A. Waterman, and Douglas B. Lenat, editors. Addison-Wesley Publishing Company, Inc., Reading Mass. 1983), are executed first. The rule-based system, which is programmed with information about common failures and the symptoms thereof, provides a rapid resolution to the determination of any failures that the system has been programmed to detect. However, for complex machines, anticipating every possible combination of failures and associated symptoms (and hence programming every combination of failures and symptoms into the rule-based system) is, if not impossible, at least extremely impractical. Therefore, a particular failure may not be detectable by the rule-based system. When this occurs, control passes from the steps 54 of the rule-based system to the steps 58 of the QRS, which can isolate failures without being preprogrammed with all of the combinations of machine failures and symptoms.

Execution of the failure isolation software begins at an initial step 62, where the rule-based system is enabled. At a second step 63, the user is prompted to enter an observed condition. An observed condition is a physical description of the state of a particular portion of the machine, such as the voltage between two particular points or the observation that a particular switch is in the "ON" position while a particular indicator is "OFF". After the step 63, control passes to a step 64 where the rule-based system attempts to isolate the failure by applying preprogrammed rules to the observed conditions.

It is possible for an observed condition to indicate a particular failure directly. For example, an observation that the voltage across the terminals of a battery is zero could directly isolate the failure to a dead battery (assuming the existence of a rule stating that if the voltage measured across the terminals of a battery is zero, then the battery is dead). Other observed conditions may isolate the failure to a group of possible failures. For example, an observation that the voltage gage for the battery reads zero indicates that either the battery is dead, the gage is malfunctioning, or that the wire between the battery and the gage is broken (assuming again that an appropriate rule has been programmed into the system).

After the step 64, control passes to a step 65, where a test is made to determine whether the failure has been isolated. If the failure has been isolated to a single component, processing is complete. If the failure has not been isolated to a single component, control passes to a step 66, where a test is made to determine whether further failure isolation is possible. If further isolation is possible, control passes to the step 63, where the user is prompted for another observation. The steps 63-66 form an iterative loop wherein the user is continuously prompted to enter more observations which the software uses to further isolate a failure.

However, at the step 66 it may not be possible to further isolate the failure because of the inherent limitations of the rule system (i.e. every possible combination of observations and related failures has not been programmed into the system). For example, suppose the observations were made that the voltage across the battery measured twelve volts, the battery voltage gage read zero, and the gage was not broken. If the rule system were not programmed to take into account the possibility that a wire between the gage and the battery may be broken, then an impasse is reached. The observed conditions do not correspond to any combination of observed conditions and failures which had been anticipated when the rule system was programmed. When this occurs, control passes from the step 66 to a step 67 where the rule system is disabled The transition from the step 66 to the step 67 also corresponds to a transition from the steps 54 of the rule system to the steps 58 of the QRS.

After the rule system has been disabled at the step 67, control passes to a step 68 where the QRS is enabled. Following the step 68 is a step 69 where the QRS attempts to isolate the failure. The details of QRS failure isolation are explained in more detail hereinafter. Following the step 69 is a step 70 where a test is made to determine whether the failure has been isolated. If the failure has been isolated, processing is complete. Otherwise, control passes to a step 71 where a test is made to determine if further isolation is possible. If no further isolation by the QRS is possible, then processing is complete. Otherwise, control passes to the step 72 where the user is prompted for observations. Because the transition from the steps 54 of the rule system to the steps 58 of the QRS are transparent to the user (i.e. the user is not informed that the transition has taken place) the prompt seen by the user at the step 72 is similar to the prompt that the user sees at the step 63. Control passes from the step 72 back to the step 69 where the QRS attempts again to isolate the machine failure.

Unlike the rule-based system, the QRS does not directly correlate observations to specific failures. Instead, the QRS uses a computer model of the machine to iteratively hypothesize the failure of specific components and to derive, from user observations, predictions for the values of various machine parameters such as current flow, voltage, and fluid flow for each of the hypotheses. If at any time during the derivation process, the predictions for a particular hypothesis are found to be inconsistent (either with themselves or with subsequent observations), the hypothesis is discarded.

The QRS depicts the machine using qualitative physics, a computer modeling technique wherein each component of the machine is represented as a black box having a plurality of terminals and a corresponding set of variables wherein each of the variables represents an attribute (e.g flow, pressure, temperature, etc.) of a substance (e.g. air, fuel, etc.) that may enter or leave a terminal. Each of the variables can take on a finite set of values. The operation of a component is defined by confluences, a set of qualitative equations which define the relationships between variables of the component. For example, a pipe may be represented as having two terminals and two variables: one representing the flow of fluid into the pipe and one representing the flow of fluid out of the pipe. A confluence which describes the operation of the pipe states that the variable which represents the flow out of the pipe has the same sign as the variable which represents the flow into the pipe. For more information about qualitative physics, a thorough discussion can be found in de Kleer, Johan and Brown, John Seely, "The Origin, Form and Logic of Qualitative Physical Laws", Proceedings of the Eighth International Joint Conference on Artificial Intelligence, Karlsruhe, W. Germany, Aug. 1983.

The various components of the machine are grouped hierarchically. A compound component is comprised of a plurality of subcomponents while an elementary component is a component having no substructure. For example, a power supply may be represented as a single component at one level of the hierarchy, but may in fact be comprised of a number of components (e.g. capacitors, transformer, etc.) at another, lower, level of the hierarchy. At the highest level of the hierarchy, the entire machine is represented as a single compound component. At the lowest level of the hierarchy are all of the elementary components which comprise the machine.

Since the components are modeled as black boxes, it may be useful to examine a component at a lower level of the hierarchy in order to further isolate a failure (i.e. to get inside the black box in order to obtain more information). For example, after determining that a power supply has failed, the QRS may expand the power supply component into subcomponents and continue the failure isolation process at that level of the hierarchy.

The relationships defined by the various confluences of a particular component are called "constraints". The QRS computes the effects of the failure of a particular component by suspending (i.e. removing) the constraints of that component. For example, for a machine having three components, X, Y, and Z, the QRS would test a hypothesis that component X has failed by creating a qualitative physics model of the machine with the constraints of the confluences of component X suspended (i.e. a model of the machine which contains only the confluences for components Y and Z, which are assumed to have not failed). The QRS then generates a set of predictions (predicted values of variables) using user observations and the confluences. If the resulting predictions are consistent, X remains as a valid hypothesis. Otherwise, X is eliminated as a hypothesis. A hypothesis can also be eliminated if a subsequent observation is found to be inconsistent with a prediction. A thorough discussion of constraint suspension can be found in Davis, Randall "Diagnostic Reasoning Based on Structure and Behavior", *Artificial Intelligence*, 24 (1984), 347–410.

The QRS begins with an initial hypothesis that no components of the machine have failed. If the predictions generated from that hypothesis are consistent, then the QRS software concludes that there are no failures and the failure isolation process is terminated. Otherwise, the QRS software generates a plurality of hypotheses, each corresponding to the failure of a single component of the machine. The predictions associated with each of these hypotheses are generated and then tested for consistency. If all of the predictions associated with the single component hypotheses are inconsistent (thus disproving all of the hypotheses), the QRS software generates a new set of hypotheses corresponding to the simultaneous failure of two machine components. If all of the dual component predictions are found to be inconsistent, the QRS software generates a set of hypotheses, each corresponding to three simultaneous failures, and so on.

For example, for a machine having three components A, B, and C, the QRS would initially generate a set of confluences based on the hypothesis that no components have failed (i.e. all of the confluences for all of the components), determine predictions for that hypothesis, and test the consistency of those predictions. If the predictions which are based on the hypothesis are consistent, then the hypothesis that no components have failed has been verified and the failure isolation process is terminated. Otherwise, the QRS generates three new hypotheses: a hypothesis that only component A has failed, a hypothesis that only component B has failed, and a hypothesis that only component C has failed. The QRS then generates three sets of predictions: predictions for hypothesis A, predictions for hypothesis B, and predictions for hypothesis C. The predictions for hypothesis A are the predicted values that the variables (i.e. machine parameters, such as current, fluid flow, voltage, etc.) would equal if hypothesis A were true. Similarly, the predictions associated with hypothesis B are the predicted values that the variables would equal if hypothesis B were true and the predictions associated with hypothesis C are the predicted values that the variables would equal if hypothesis C were true. If the predictions associated with hypothesis A are inconsistent, then the hypothesis that A has failed is inconsistent and hypothesis A is eliminated from the list of valid hypotheses. If the predictions associated with B and C are consistent, then further failure isolation, to determine whether component B or component C has failed, may be required.

For the above example, it is possible for the QRS to be able to eliminate hypotheses A, B, and C, thereby leading to the conclusion that more than one component of the machine has failed simultaneously. The QRS would then create three new hypotheses: hypothesis AB, which assumes components A and B have simultaneously failed, hypothesis AC which assumes components A and C have simultaneously failed, and hypothesis BC, which assumes components B and C have simultaneously failed. The QRS then begins failure isolation using these hypotheses. For complex machines, increasing the number of failed components per hypothesis increases the processing demands on the computer. When the QRS has eliminated all of the N component hypotheses, the user is asked whether the QRS software should proceed to begin generating and testing N+1 component hypotheses or terminate failure isolation altogether. The user may prefer not to wait for the QRS to generate and test the new set of hypotheses.

Figure 4:
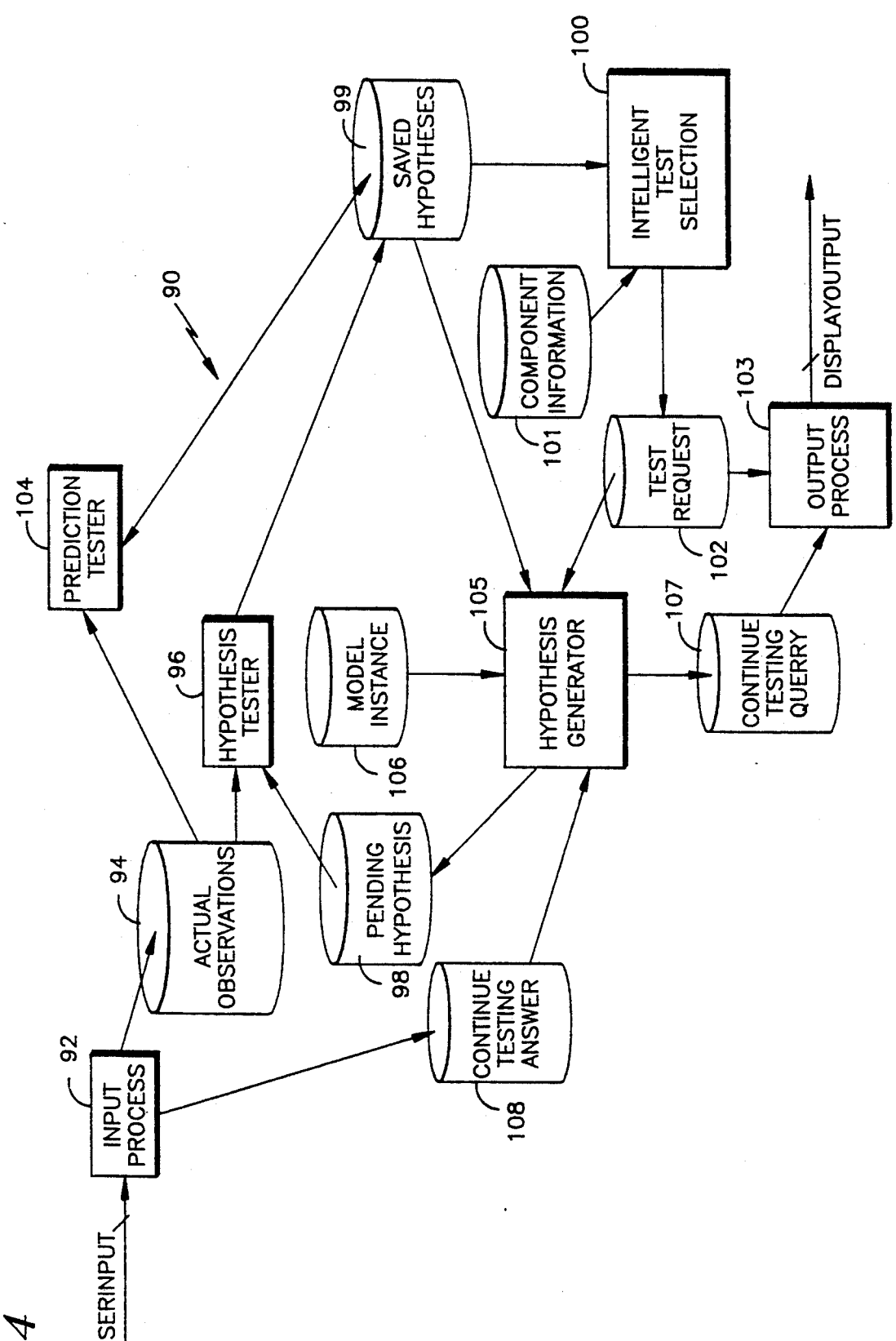
FIG. 4 is a dataflow diagram which illustrates operation of Qualitative Reasoning System software.

FIG. 4 is a dataflow diagram 90 which illustrates operation of the QRS. Boxes on the diagram 90 indicate program modules (i.e. portions of the QRS software) while cylinders indicate data elements (i.e. portions of QRS data). Arrows between boxes and cylinders indicate the direction of the flow of data. Unlike a flowchart, no portion of the dataflow diagram 90 indicates any temporal relationships between the various modules.

Observations which are made by the user are provided to the QRS software by an input signal USERINPUT, which is indicated on the diagram 90. The USERINPUT signal is processed by an input process code module 92, which converts keystrokes entered by the user into a format that can be processed by the QRS software. The output of the input process module 92 is stored in an actual observations data element 94, which contains a cumulative history of all of the observations made by the user since the start of the failure isolation process. The actual observations data element 94 is initialized with data from the observations made by the user during the rulebased system phase of the failure isolation process.

A hypothesis tester code module 96 uses the actual observations data element 94 and a pending hypothesis data element 98 to generate potentially valid hypotheses and predictions for each of the hypotheses. The pending hypothesis data element 98 contains a hypothesis to be tested. The hypothesis tester 96 tests the hypothesis by propagating the observations 94 through the confluences of the hypothesis to generate predictions which must be true for the hypothesis to be true. During the process of generating predictions, the hypothesis tester 96 may find an inconsistency. For example, one subset of confluences may predict a positive voltage between two particular points while a different subset of confluences may predict a negative voltage between the same two points. When this occurs, the hypothesis being tested has been disproved and is discarded by the hypothesis tester 96. A hypothesis from the pending hypothesis data element 98 which cannot be disproved by the hypothesis tester 96, and the predictions associated therewith, are output to a saved hypotheses data element 99.

For example, suppose the pending hypothesis data element 98 contained hypothesis A. The hypothesis tester 96 would test the validity of hypothesis A by examining a model of the machine having the constraints of component A suspended (i.e. a model containing all component confluences except the confluences which describe the operation of component A) and then predicting the values of variables. If during the course of generating predictions for hypothesis A, the hypothesis tester 96 finds an inconsistency, then hypothesis A has been disproved. Otherwise, hypothesis A and the predictions associated with hypothesis A are output to the saved hypotheses data element 99.

If the saved hypotheses data element 99 contains more than one hypothesis, it may be useful for the user to enter more observed conditions in order to provide information to eliminate some of the hypotheses. An intelligent test selection code module 100 is provided with input from the saved hypotheses data element 99 and a component information data element 101. The component information data element 101 contains empirical data such as component failure rates and testing time for potential observations. The intelligent test selection 100 uses the predictions from the saved hypotheses data element 99 and information from the component information data element 101 to determine the best test for the user to perform (i.e. the observation which is most likely to eliminate one or more hypotheses while simultaneously minimizing the inconvenience to the user). The intelligent test selection 100 outputs the best test information to a test request data element 102. An output process code module 103, which is provided with data from the test request data element 102, transforms the test request 102 into a human readable format and provides a signal, DISPLAYOUT, which causes a user prompt, indicating the next observation for the user to make, to be placed on the display 32 of the PMA 30.

An observation made by a user may be directly contrary to a prediction for a hypothesis stored in the saved hypotheses data element 99. A prediction tester 104 examines hypotheses and associated predictions in the saved hypotheses data element 99 and eliminates those hypotheses having predictions contrary to a user observation. For example, suppose the saved hypotheses data element 99 contains hypothesis A, hypothesis B, and hypothesis C and that hypothesis A predicts a positive value for a particular voltage, hypothesis B predicts a negative value for the same voltage and hypothesis C makes no prediction about the value of the voltage. Further assume that the intelligent test selection 100 chooses the voltage measurement to be the best test and, after being prompted, the user enters the voltage as positive. The prediction tester 104 can eliminate hypothesis B from the saved hypotheses data element 99 because the prediction for hypothesis B that the voltage is negative is incorrect, thereby disproving hypothesis B. Hypothesis A correctly predicts that the voltage is positive, so hypothesis A remains in the saved hypotheses data element 99. The prediction tester 104 cannot eliminate hypothesis C because hypothesis C makes no prediction about the voltage.

It is possible for the intelligent test selection 100 to not be able to generate any observations for the user to perform which would eliminate any of the hypotheses stored in the saved hypotheses data element 99. When this occurs, a hypothesis generator 105, upon detecting that the test request data element 102 is empty, generates more hypotheses by expanding one or more of the components associated with hypotheses within the saved hypotheses data element 99 into subcomponents, and generating hypotheses based on those subcomponents. The hypothesis generator 105 uses a model instance data element 106, which contains the qualitative physics descriptions of the components and information regarding the hierarchical ordering of the components. A detailed description of the construction and contents of the model instance 106 is contained in this application, hereinafter. The output of the hypothesis generator 105 is provided to the pending hypothesis data element 98.

For example, suppose that the saved hypotheses data element 99 contains a first hypothesis corresponding to the failure of the machine power supply and a second hypothesis corresponding to the failure of the machine fuel system. Further suppose that the intelligent test selection 100 is unable to provide the user with an observation to perform to distinguish between the two, causing the test request data element 102 to be empty. The hypothesis generator 105 detects that the test request data element 102 is empty and expands the power supply into subcomponents (i.e. capacitors, transformer, etc.) and also expands the fuel system into the subcomponents thereof. A new set of hypotheses based on the subcomponents is created. The new set of hypotheses, which the hypothesis generator 105 will provide to the pending hypothesis data element 98 (one at a time), is tested by the hypothesis tester 96 and the iterative process of prompting the user for observations and eliminating hypotheses will continue. Note then that the failure isolation process is complete when the saved hypotheses data element 99 contains only one hypothesis which assumes the failure of one or more elementary components.

It is also possible for the hypothesis tester 96 to eliminate all of the hypotheses stored in the pending hypothesis data element 98, thereby causing the saved hypotheses data element 99 to be empty. This occurs when the number of failed components per hypothesis is greater than had been assumed. Eliminating all of the hypotheses corresponding to N simultaneously failed components indicates that more than N machine components have failed. For example, if all of the hypotheses corresponding to a single component failure are eliminated by the hypothesis tester 96 and/or the prediction tester 104, then it logically follows that more than one component has simultaneously failed. (Note that the possibility that no components have failed is tested initially).

When an entire set of hypotheses corresponding to N component failures have been disproved by the hypothesis tester 96, the hypothesis generator 105 asks the user for permission to generate a new set of hypotheses corresponding to N+1 component failures by writing user prompt information to a continue testing query data element 107. The continue testing query data element 107 is provided as an input to the output process module 103, which transforms the query 107 into a human readable format for output to the display 32. The user's answer to the question is provided by the USERINPUT signal, processed by the input process 92 and stored in a continue testing answer data element 108. If the user chooses not to continue testing, failure isolation is terminated. Otherwise, the continue testing answer data element 108, which is provided as an input to the hypothesis generator 105, causes the hypothesis generator 105 to produce a new set of hypotheses (using information from the model instance data element 106), which correspond to one more failed component than the previous set of hypotheses.

The hypothesis generator 105 may also provide the pending hypothesis data element 98 with hypotheses from the saved hypotheses data element 99. The hypothesis generator 105 uses input provided by the test request data element 102 to determine if the saved hypotheses data element 99 contains hypotheses which make no predictions for a variable which the user is requested currently to observe. Hypotheses which make no prediction for the most recently observed variable are passed from the saved hypotheses data element 99 to the pending hypothesis data element 98 in order to be retested by the hypothesis tester 96. Some of the hypotheses which are retested may be invalidated as new observations become available.

Figure 5:
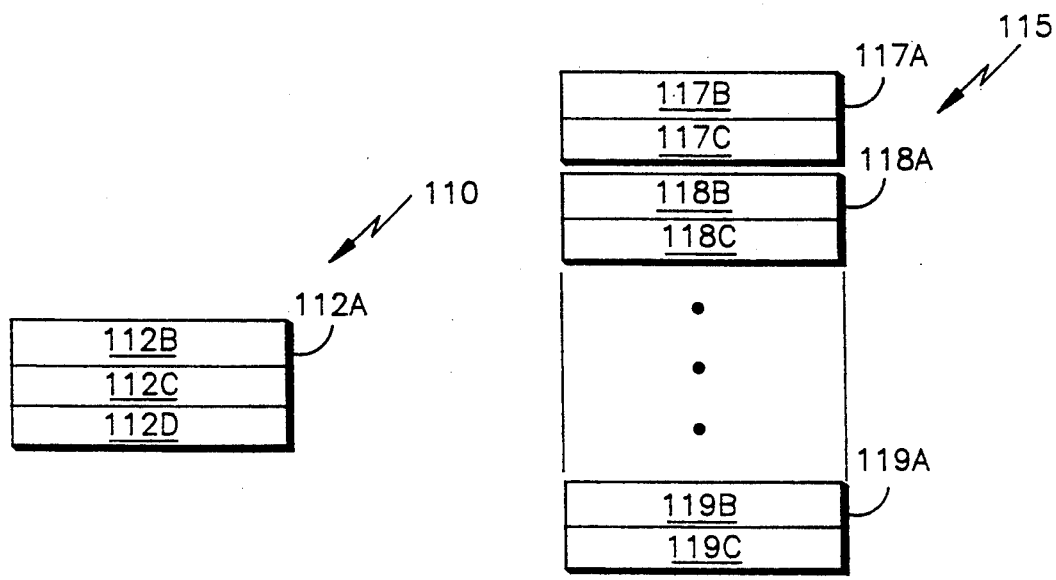
FIG. 5 illustrates data structures used by the Qualitative Reasoning System software.

FIG. 5 illustrates data structures used by the QRS software. A pending hypothesis data structure 110, which represents data stored in the pending hypothesis data element 98, contains a pending hypothesis 112A which is comprised of a hypothesis identification element 112B, a prediction table 112C, and a cached confluences table 112D. The hypothesis identification element 112B contains information to identify the particular pending hypothesis. For example, the hypothesis identification element 112B may identify the pending hypothesis 112A as a hypothesis which assumes a failed power supply.

The prediction table 112C contains all of the variables (i.e. machine parameters) associated with the pending hypothesis 112A. The prediction table 112C is constructed by the hypothesis generator 105, which determines all of the variables of a hypothesis when the hypothesis is created. Initially, the prediction table 112C contains no values for the variables. Each time a hypothesis is tested, however, the hypothesis tester 96 predicts more values for the variables of the prediction table 112C as more observations become available.

The cached confluences table 112D contains all of the model confluences for the pending hypothesis 112A. The cached confluences table 112D can be indexed by each of the variables from the prediction table 112C. The elements of the cached confluences table 112D contain all of the model confluences in which the index variable appears, thereby providing the hypothesis generator 96 with a means for rapidly accessing confluences associated with a hypothesis.

A saved hypotheses data structure 115, which represents data stored in the saved hypotheses data element 99, contains a first current hypothesis 117A, a second current hypothesis 118A, and an Nth current hypothesis 119A. The first current hypothesis 117A contains a hypothesis identification element 117B and a prediction table 117C. Similarly, the second current hypothesis 118A contains a hypothesis identification element 118B and a prediction table 118C and the Nth current hypothesis 119A contains a hypothesis identification element 119B and a prediction table 119C. The hypothesis identification elements 117B, 118B, 119B contain information to identify the particular saved hypotheses and are similar to the hypothesis identification element 112B of the pending hypothesis 112A. The prediction table 117C are the same as the prediction tables 112C from the pending hypothesis 112A except that the hypothesis tester 96 may have provided values for some of the variables.

Figure 6:
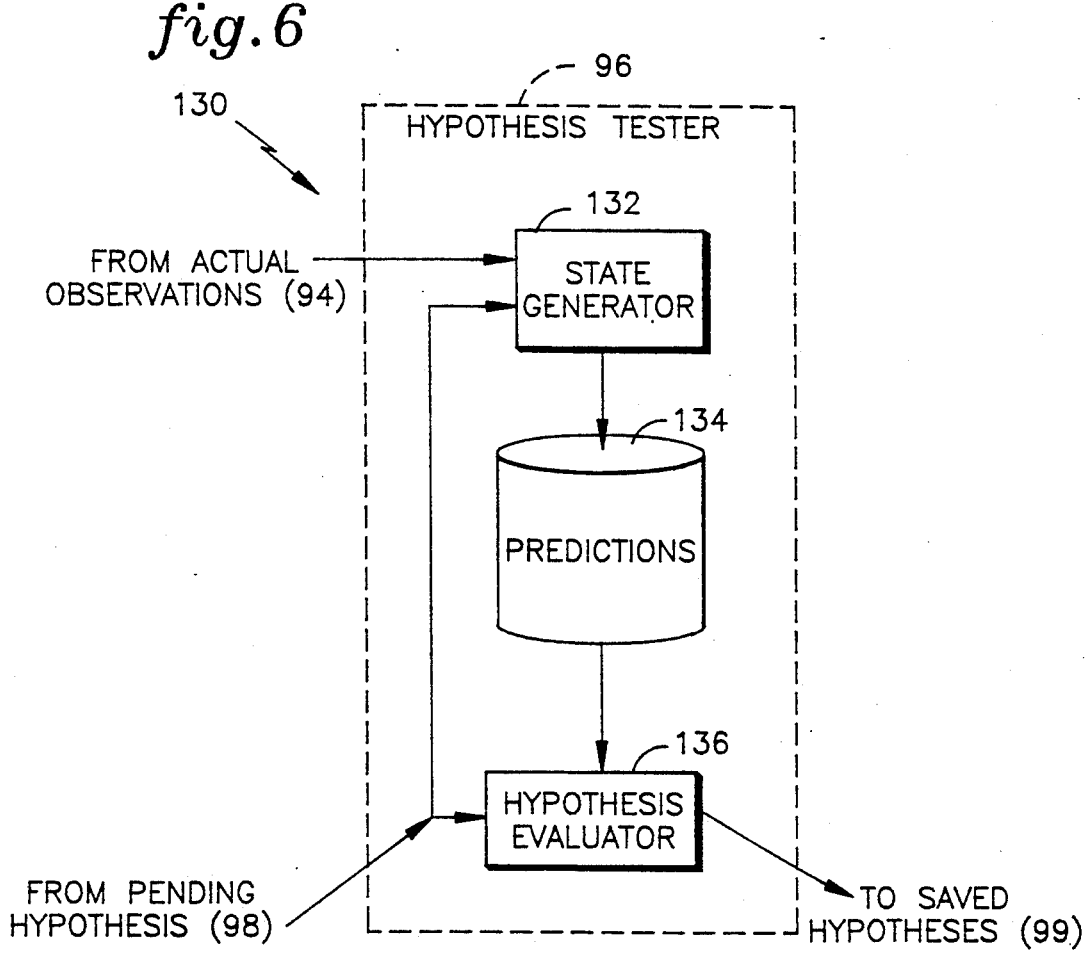
FIG. 6 is a dataflow diagram illustrating operation of a hypothesis tester within the Qualitative Reasoning System software.

FIG. 6 is a dataflow diagram 130 illustrating operation of the hypothesis tester 96. A state generator 132 is provided with input from the actual observations data element 94 and from the pending hypothesis data element 98. The state generator 132 processes the actual observations 94 and the pending hypothesis 98 to produce a predictions data element 134 which contains the prediction table for the particular hypothesis that is being tested. The state generator 132 produces the predictions data element 134 by filling in the prediction table (from the pending hypothesis data element 98) with values for some of the variables, which are determined by processing the observations 94 and the cached confluences from the pending hypothesis data element 98. If the state generator 132 detects an inconsistency while attempting to predict values for the predictions data element 134, a null table, instead of the prediction table, is stored in the predictions data element 134. Actual calculation of the values is performed by manipulating the LISP expressions which represent the model confluences. The manipulation of LISP expressions is known to those skilled in the art.

A hypothesis evaluator 136 is provided with data from the predictions data element 134 and the hypothesis from the pending hypothesis data element 98. For each hypothesis, the hypothesis evaluator 136 determines if the predictions data element 134 contains a null table. If not, the hypothesis evaluator 136 passes both the hypothesis (from the pending hypothesis data element 98) and the associated prediction table (from the predictions data element 134) on to the saved hypotheses data element 99. Otherwise, the hypothesis being tested has been invalidated and is not passed on.

Figure 7:
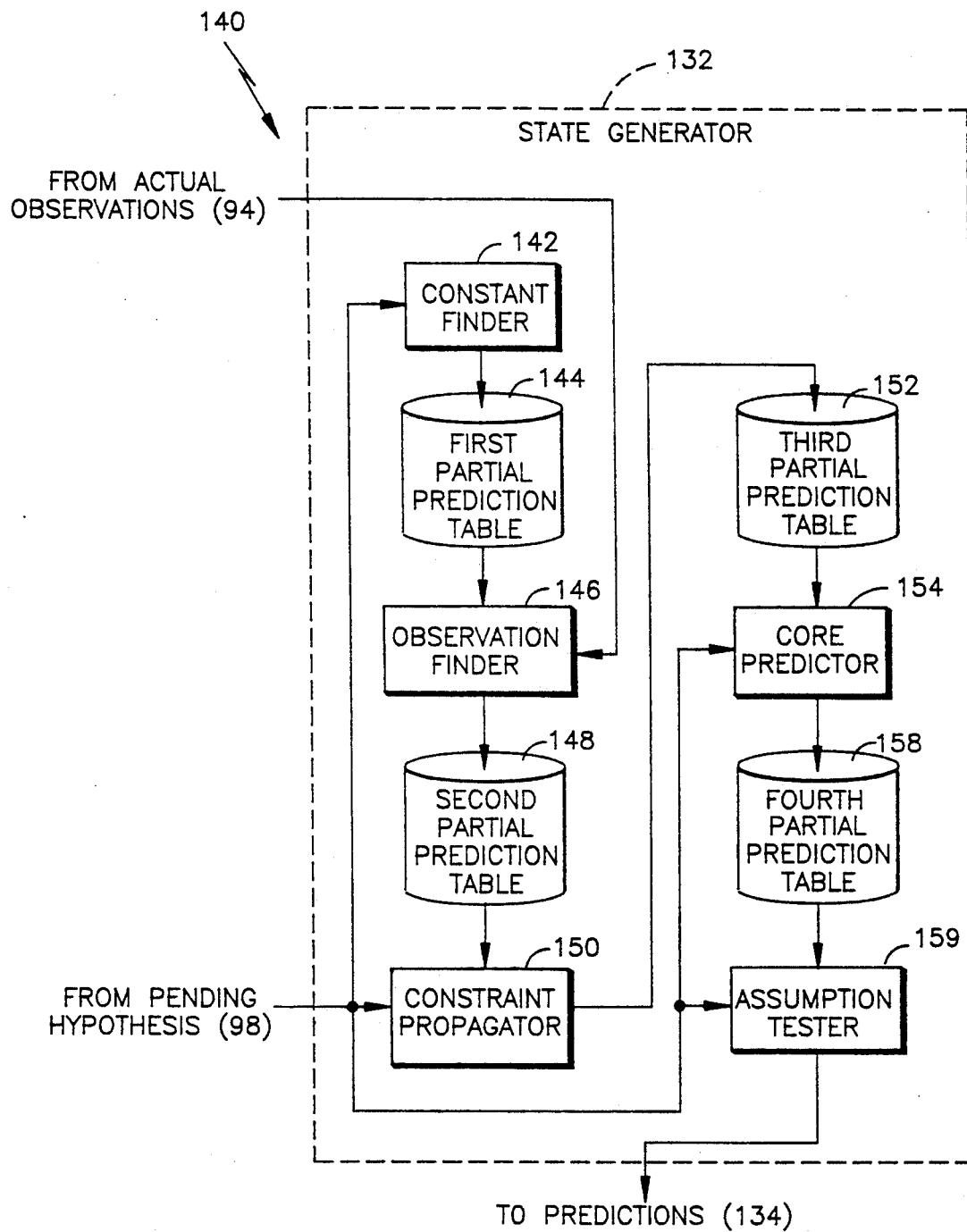
FIG. 7 is a dataflow diagram which illustrates operation of a state generator within the Qualitative Reasoning System software

FIG. 7 is a dataflow diagram 140 which illustrates operation of the state generator 132 in more detail. A constant finder 142 is provided with the prediction table and the cached confluences table from the pending hypothesis data element 98. The constant finder 142 uses the cached confluences to iterate through the prediction table and fill in values for variables of the prediction table having confluences which define a variable in terms of a constant expression. For example, a battery may be described by a confluence wherein the voltage across the terminals of the battery is a constant positive voltage. The constant finder 142 outputs, to a first partial prediction table data element 144, the result of filling the constants into entries of the prediction table.

The first partial prediction table 144 and the actual observations data element 94 are provided as inputs to an observation finder 146, which fills in values for variables of the first partial prediction table 144 that correspond to observations entered by the user. For example, if the user has measured the voltage across a resistor and entered the observation, the observation finder 146 would fill in the value for the variable in the first partial prediction table 144 corresponding to the resistor voltage. The observation finder 146 outputs, to a second partial prediction table data element 148, the result of filling the observations into entries of the first partial prediction table 144.

The second partial prediction table 148 is provided as an input to a constraint propagator 150, which uses the known variable values stored in the second partial prediction table 148 (i.e. the variable values which have already been determined by the constant finder 142 and the observation finder 146 and possibly variables determined from a previous test of the hypothesis) and the cached confluences from the pending hypothesis data element 98 to determine the values for more of the variables. The constraint propagator 150 propagates the known variables through the confluences to determine if one or more confluences for each unknown value can be reduced to the form of unknown variable equals a constant expression. For example, a confluence describing the flow of fluid through a valve may indicate that when the valve is open, the flow out of the valve equals the flow into the valve and when the valve is closed, the flow out of the valve equals zero. If the valve is determined to be open (a user observation) and the flow in is determined to be positive (a model constant), then the constraint propagator 150 can determine that the flow of fluid out of the valve is positive. Furthermore, if the output of a valve is connected to a pipe, the constraint propagator 150 may also determine the flow into and out of the pipe.

A variable which is determined by the constraint propagator 150 is thereafter propagated through the constraints with the other known variables. The output of the constraint propagator is stored in a third partial prediction table 152. If the constraint propagator detects an inconsistency, a null table is stored in the third partial predictions data element 152.

The third partial prediction table 152 is provided as an input to a core predictor 154. If the third partial prediction table 152 is not a null table, the core predictor 154 iterates through the values for each of the unknown variables of the third partial prediction table 152 to determine if, given the values of the known variables, an unknown variable can have one and only one possible value. For example, suppose the confluences for a switch indicate that if the switch is closed, the current out of the switch equals the current into the switch and that if the switch is open, the current out of the switch is zero. Further suppose that the current out of the switch is observed as a positive, non-zero, value. Core predictions would indicate that the one and only one possible legal value for the state of the switch is closed since assuming that the switch is open results in an inconsistency (i.e the switch can't simultaneously be open and have a positive current). The output of the core predictor 154 is stored in a fourth partial prediction table data element 158. Note that it is possible for the core predictor 154 to find an inconsistency for a particular hypothesis. For example, using the switch example from above, further assume that the input current to the switch is observed to be a negative value. It is inconsistent for the input current of a switch to be negative while the output current of the switch is positive, irrespective of whether the switch is open or closed. Therefore, the hypothesis being tested must not be valid. That is, the hypothesis associated with the cached confluences and third partial prediction table 152 being processed by the state generator 132 must be false. When this occurs, the core predictor 154 nulls (i.e. sets to null) the fourth partial prediction table 158.

The fourth partial prediction table 158 is provided as an input to an assumption tester 159 which determines if, given the predictions (i.e the variables having a value set thereto) contained in the fourth partial prediction table 158, at least one combination of values can be assigned to the remaining unknown variables which does not result in any inconsistencies. Of course, if the fourth partial prediction table 158 is a null table, the assumption tester 159 passes the null table to the predictions data element 134 so that the hypothesis tester 136 can discard the hypothesis.

However, assuming that the fourth partial prediction table 158 is not a null table, the assumption tester 159 assumes values for each of the unknown variables and then determines if a consistent set of predictions can be derived from those values. The software uses a recursive routine which stores a value for an unknown variable into the fourth partial prediction table 158 (thereby temporarily transforming the unknown variable into a known variable), propagates all known variables, and then calls itself. If during the propagation phase an inconsistent set of predictions is generated, the assumption tester 159 backtracks through the recursion in order to assume different values for the variables. If a consistent set of values for all of the unknown variables is found, the assumption tester 159 passes the fourth partial prediction table 158 (having restored unknown variables to their original state) on through to the predictions data element 134. Otherwise, the assumption tester 159 provides a null table to the predictions data element 134.

While it is possible for the assumption tester 159 to randomly assign values to unknown variables, doing so can be very inefficient of processor time because the number of random combinations can be quite large. For example, if there are twenty unknown variables each having three possible values, the number of random combinations is over three billion. Therefore, instead of randomly assigning values to unknown variables, the assumption tester 159 uses dynamic assumption ordering to assign values to variables.

Dynamic assumption ordering is the process of locating target confluences, assigning a value to a variable which appears in the greatest number of target confluences, and propagating the variable assignment. A target confluence is a confluence wherein assigning a value to one of the variables of the confluence is likely to result in either the determination of the values of other unknown variables or in an inconsistency, thereby allowing the hypothesis to be rejected. The most simple example of a target confluence is a confluence stating that variable V1 equals variable V2. If a value is assigned to the variable V1, the value for the variable V2 may be determined. Furthermore, it is possible to have a case wherein for every assignment of a value for V1, an inconsistency results, thereby allowing the assumption tester 159 to pass a null table to the prediction table data element 134. For example, assume that a first confluence states that the variable V1 equals the variable V2, a second confluence states that the variable V1 equals the negative of V2, and a third confluence states that the variable V1 equals the variable V2 plus a constant positive value. There is no combination of values which can solve the constraints placed on V1 and V2 by the three confluences. If the assumption tester 159 initially chooses either V1 or V2 for value substitution rather than randomly choosing variables which do not appear in target confluences, the inconsistency will be discovered sooner rather than later.

Figure 8:
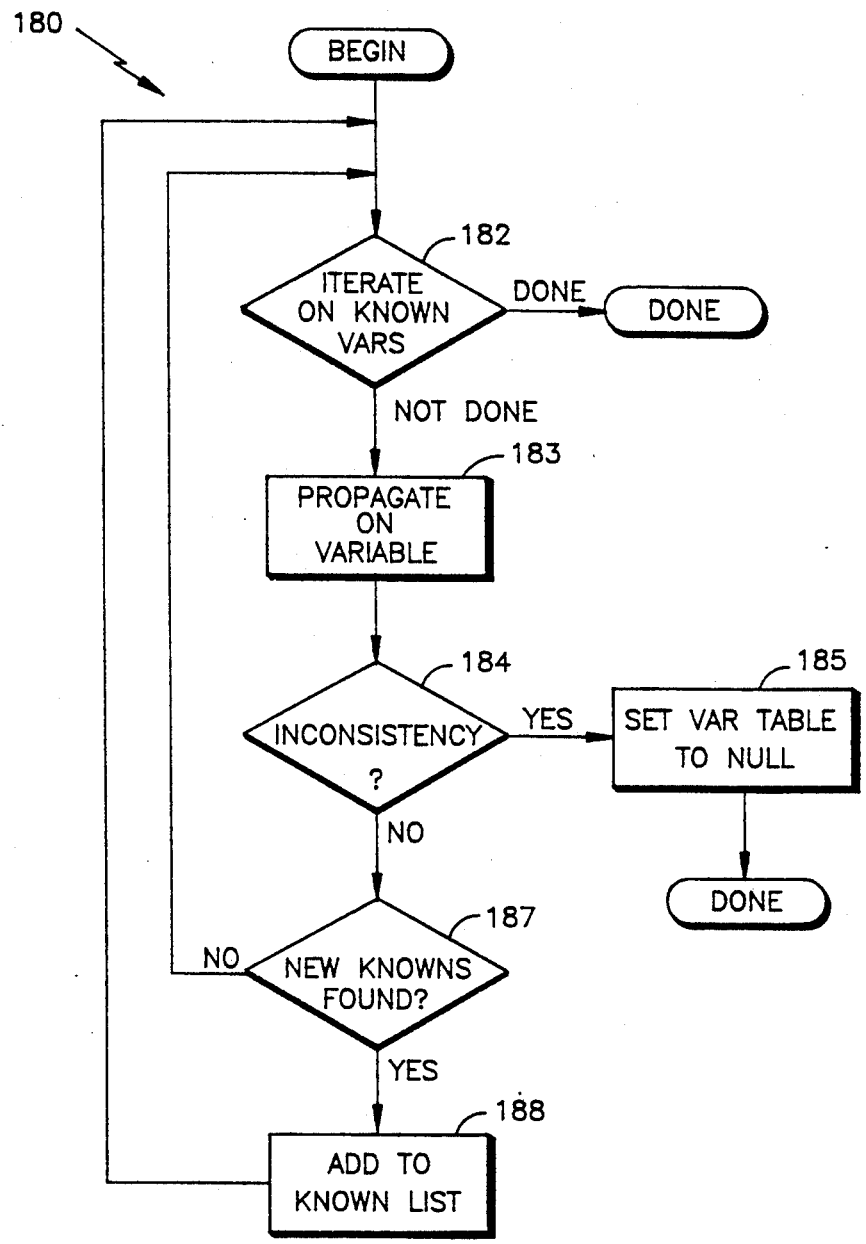
FIG. 8 is a flowchart illustrating steps of a constraint propagator within the state generator.

FIG. 8 is a flowchart 180 illustrating in more detail operation of the constraint propagator 150. At a first step 182, iteration through the known variables of the second partial prediction table 148 is controlled. At the step 182, an iteration counter is first initialized and then incremented for each subsequent execution. Note that the remaining steps of the flowchart 180 operate on one variable at a time. If the iteration counter has reached the end of the list of known variables of the second partial prediction table 148, execution is complete. Otherwise, control passes to a step 183, where all of the confluences associated with the variable (from the cached confluences table) are examined and possibly solved using all of the known values of variables from the second partial prediction table 148. A value for an unknown variable may be determined at the step 183 if the unknown variable is expressed only in terms of known variables (i.e all of the variables of a confluence, except one, are known). Control passes from the step 183 to a step 184 where a test is made to determine whether an inconsistency has been found at the step 183. An inconsistency occurs when two contrary predictions are made for the same variable (e.g. one subset of the confluences predicts that a certain variable is positive while a second subset of the confluences predicts that the same variable is negative). If an inconsistency is found at the step 184, control passes to the step 185 where the third partial prediction table 152 is nulled and execution of the constraint propagator 150 is terminated.

If no inconsistencies are found at the step 184, control passes from the step 184 to a step 187, where a test is made to determine if the values of any unknown variables have been found at the step 183. If new known variables have been found, control passes from the step 187 to a step 188, where the new known variables are added to the list of known variables. Control passes from the step 188 back to the step 182, where the iteration counter is incremented. If no new variables were found at the step 183, control passes from the step 187 back to the step 182.

Figure 9:
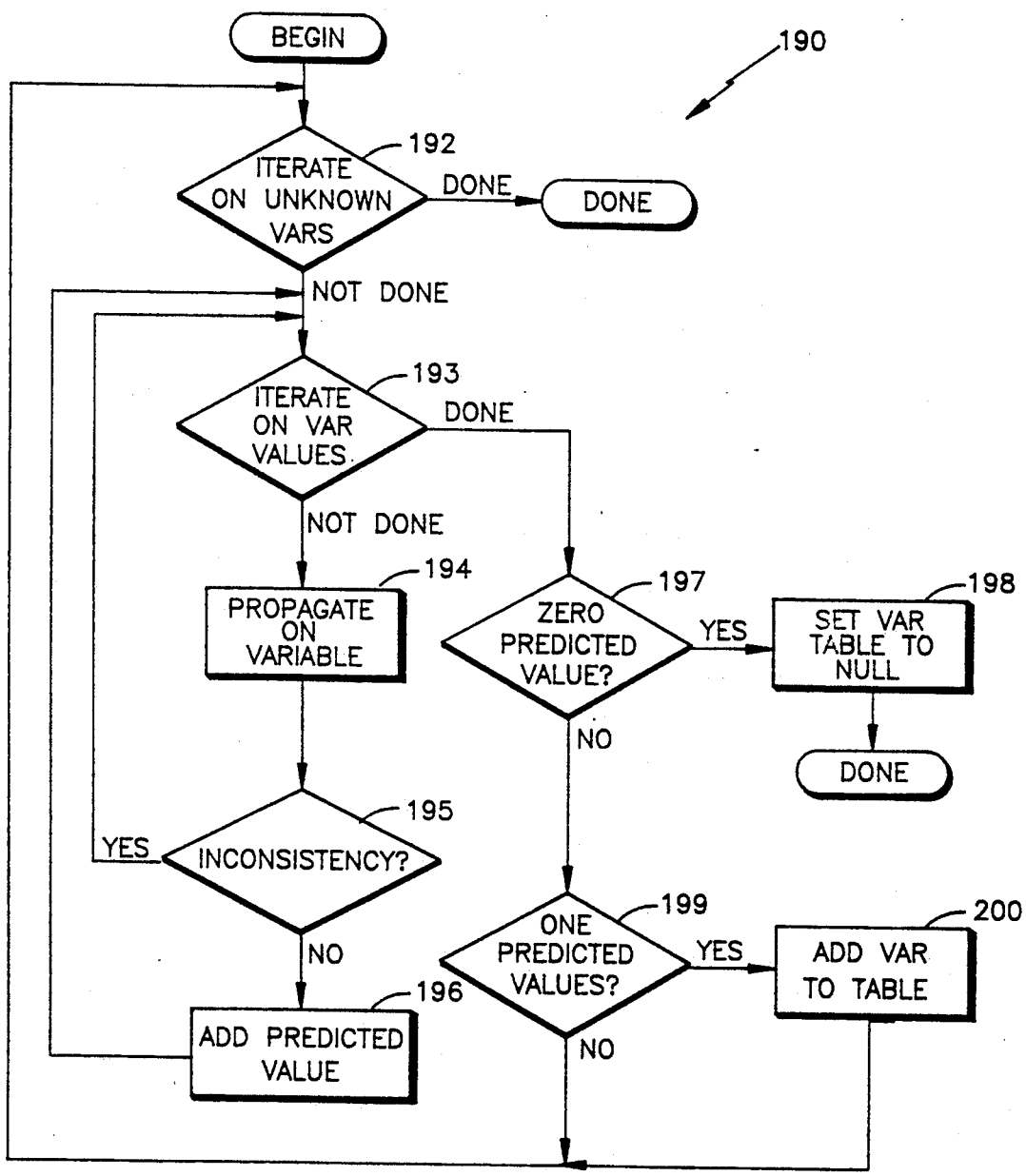
FIG. 9 is a flowchart illustrating operation of a core predictor within the state generator.

FIG. 9 is a flowchart 190 illustrating in more detail operation of the core predictor 154. At a first step 192, iteration through the unknown variables of the third partial prediction table 152 is controlled. At the step 192, an iteration counter is first initialized and then incremented for each subsequent execution. Note that the remaining steps of the flowchart 190 operate on one unknown variable at a time. If at the step 192 processing is not complete, control passes from the step 192 to a step 193 where the variable being operated upon is checked for one or more valid values. Note that since qualitative physics is being used to model the machine, all of the variables, including those which represent real world analog quantities, have a finite number of possible values. At the step 193, the variable is iteratively set to all of the possible values which the variable can take on. If at the step 193 the variable has not yet been set to all of the possible values, control passes from the step 193 to a step 194, where the variable value is propagated through the constraints. The step 194 is similar to the constraint propagation illustrated by the flowchart 180. Control passes from the step 194 to a step 195, where a test is made to determine whether propagating the assumed value for the unknown variable through the confluences has resulted in an inconsistency. If so, control passes from the step 195 back to the step 193 for another iteration on the variable (i.e. another value is chosen for the variable). If propagating the variable value through the confluences does not result in an inconsistency, control passes from the step 195 to a step 196, where the value is added to a list of possible values for the variable. Control passes from the step 196 back to the step 193 in order to begin testing another value for the variable.

After all of the possible values for the variable have been propagated through the confluences, control passes from the step 193 to a step 197, where a test is made to determine if any of the predicted values for the variable have resulted in a consistent set of predictions. If there are no values for the variable which will result in a consistent set of predictions, control passes from the step 197 to a step 198, where the prediction table is nulled and execution is terminated. The hypothesis is not true because one of the variables can have no value which produces a consistent set of predictions. If there are not zero predicted values, control passes from the step 197 to a step 199, where a test is made to determine if there is only one value for the variable which results in a consistent set of predictions. If so, control passes from the step 199 to the step 200, where the variable and the value are added to the fourth partial prediction table 158. If only one value of the variable results in a consistent set of predictions, the variable must equal that value for the hypothesis being tested to be true. Control passes from the step 200 and from the step 199 back to the iteration step 192, where the next unknown variable is tested.

Figure 10:
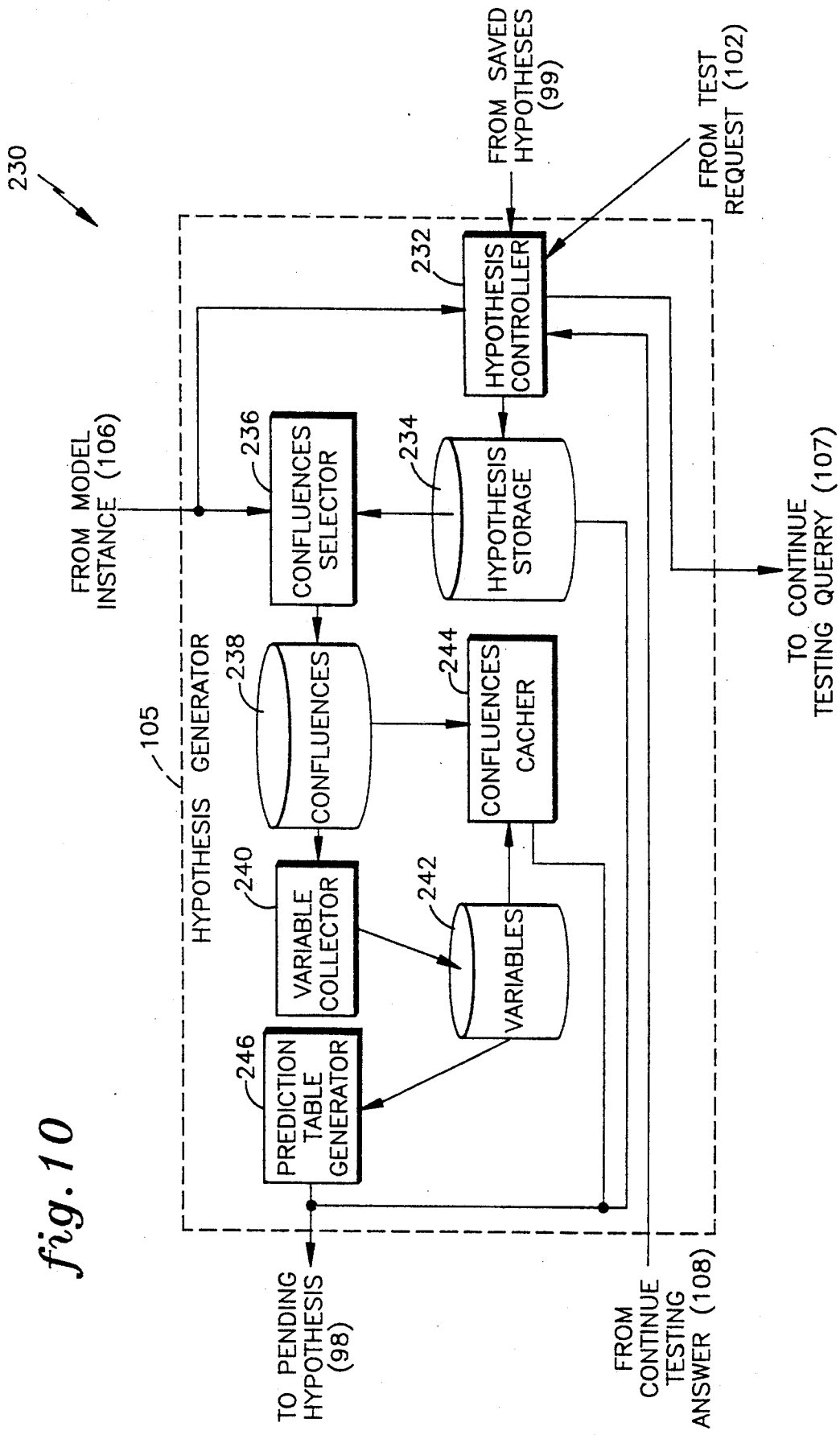
FIG. 10 is a dataflow diagram which illustrates operation of a hypothesis generator within the Qualitative Reasoning System software.

FIG. 10 is a dataflow diagram 230 which illustrates operation of the hypothesis generator 105, which generates hypotheses by a number of methods: The hypothesis generator 105 can create new hypotheses by expanding components associated with existing hypotheses from the saved hypotheses data element 99. The hypothesis generator 105 can create new hypotheses by assuming a greater number of simultaneous component failures. And, the hypothesis generator 105 can pass existing hypotheses and associated predictions from the saved hypotheses data element 99 to the pending hypothesis data element 98.

Data from the test request data element 102 is provided to a hypothesis controller 232, which upon detecting that the test request data element 102 is empty, uses information from the model instance data element 106 to create new hypotheses by expanding, into subcomponents, the components associated with hypotheses from the saved hypotheses data element 99. For example, if the saved hypotheses data element 99 contains a single hypothesis which assumes that the machine power supply has failed, the hypothesis controller 232 would create a plurality of hypotheses corresponding to failure of the subcomponents of the power supply (e.g. capacitors, transformer, bridge rectifier, etc). The hypothesis controller 232 can determine the subcomponents of a component because the model instance data element 106 contains data structures which identify the subcomponents of each compound component.

If the saved hypotheses data element 99 is empty, the hypothesis controller 232 writes data to the continue testing query data element 107 in order to determine if the user wishes to continue failure isolation with a set of hypotheses having one more failed component than the previous set of hypotheses. The user's answer is provided in the continue testing answer data element 108, which is provided as an input to the hypothesis controller 232, which uses the answer to determine whether to continue generating hypotheses.

If the test request data element 102 is not empty (i.e. the intelligent test selection 100 has prompted the user to perform an observation), the hypothesis controller 232 passes hypotheses from the saved hypotheses data element 99 to the pending hypothesis data element 98 for further testing by the hypothesis tester 96. A hypothesis which predicts a value for a variable which the user has been prompted to observe (i.e. the test stored in the test request data element 102) is not passed on since further testing could neither predict any new values for the hypothesis nor eliminate the hypothesis. For example, suppose that the saved hypotheses data element 99 contains hypothesis A, which predicts a positive fluid flow through a particular conduit and hypothesis B which makes no prediction about the flow through the same conduit. If the test request data element 102 contains a prompt for the user to observe the fluid flow through the conduit, then the hypothesis controller 232 would pass hypothesis B to the pending hypothesis data element 98 (because hypothesis B makes n prediction about the fluid flow) but would not pass hypothesis A to the pending hypothesis data element (because hypothesis A predicts a positive fluid flow through the conduit). Note that if the user actually observes a negative or a zero fluid flow through the conduit, the prediction tester 104 would eliminate hypothesis A from the saved hypotheses data element 99.

The hypothesis controller 232 stores hypotheses (either newly generated hypotheses or hypotheses from the saved hypotheses data element 99) in a hypothesis storage data element 234. The hypothesis storage data element 234 is provided as an input to a confluence selector 236 which uses data from the model instance data element 106 to determine the model confluences for each hypothesis stored in the hypothesis storage data element 234. The confluence selector 236 stores the confluences in a confluences data element 238.

The confluences data element 238 is provided as an input to a variable collector 240 which determines the unique variables for each set of confluences and stores the output in a variables data element 242. The variables data element 242 and the confluences data element 238 are provided as inputs to a confluence cacher 244, which creates a cached confluences table, a table of confluences that can be indexed by each variable wherein each element of the table contains all of the confluences in which the index variable appears (e.g. variable V1 appears in confluences C1, C5, and C6, variable V2 appears in confluences C2 and C5, etc.). The cached confluences table is used by the hypothesis tester 96 to test hypotheses without having to search confluences for the occurrence of variables.

For newly created hypotheses, the variables data element 242 is provided as an input to a prediction table generator 246 which generates an empty prediction table. For hypotheses which are obtained from the saved hypotheses data element 99, the already existing prediction table (having some variable values already determined) is used. The output of the hypothesis generator 110, which is written to the pending hypothesis data element 98, is a set of hypotheses (one at a time), an associated cached confluences table for each of the hypotheses, and an associated prediction table (which contains no values in the case of newly generated hypotheses) for each of the hypotheses.

Figure 11:
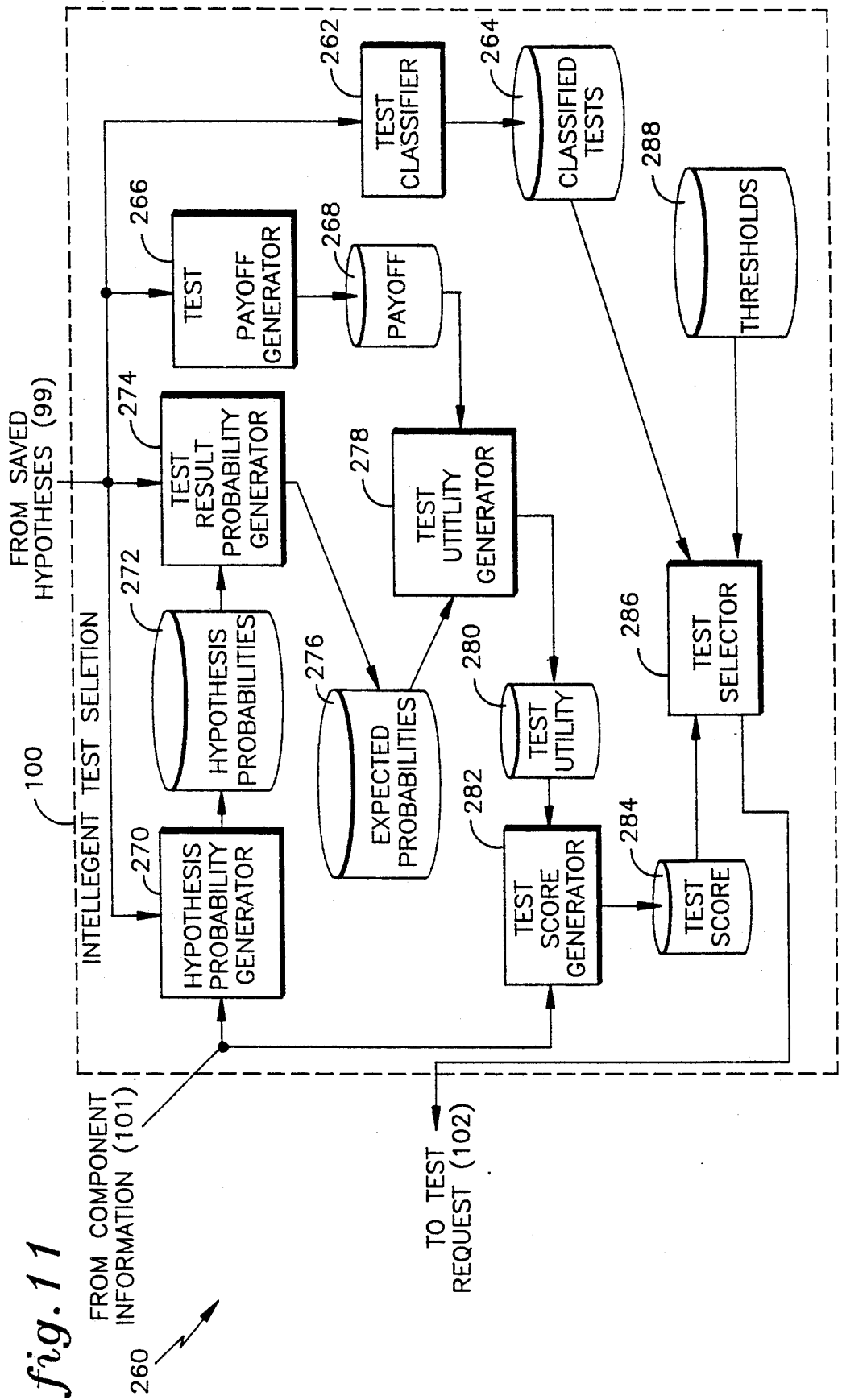
FIG. 11 is a dataflow diagram illustrating operation of the intelligent test selection within the Qualitative Reasoning System software.

FIG. 11 is a dataflow diagram 260 illustrating in detail operation of the Intelligent Test Selection 100. Input from the saved hypotheses data element 99 is provided to a test classifier 262. The test classifier 262 examines the predictions associated with each hypothesis from the saved hypotheses data element 99 and classifies each of the variables into either a type I test, a type II test, or a type III test, wherein a type I test is an observation that a user can perform which is guaranteed to allow at least one hypothesis from the saved hypotheses data element 99 to be discarded, a type II test is an observation that may or may not allow a hypothesis to be discarded, and a type III test is an observation guaranteed not to allow a hypothesis to be discarded. The output of the test classifier 262 is stored in a classified tests data element 264.

As an example of test classification, suppose that the saved hypotheses data element 99 contains hypothesis A and hypothesis B, and that hypothesis A predicts that a particular current will be greater than or equal to zero while hypothesis B predicts that the same current will be less than zero. The test classifier 262 would deem the current to be a type I test, since having the user observe (and input to the QRS) the current is guaranteed to eliminate either hypothesis A or hypothesis B, irrespective of the actual value of the current. Continuing the example, further assume that hypothesis A predicts a voltage greater than or equal to zero at a particular point and that hypothesis B predicts a voltage less than or equal to zero at the same point. The test classifier 262 would deem the voltage measurement to be a type II test since having the user observe the voltage may or may not eliminate either hypothesis A or hypothesis B. If the user measures a voltage of zero, then neither hypothesis A nor hypothesis B can be eliminated but if the user measures a non-zero voltage, either hypothesis A or hypothesis B can be eliminated. Further continuing the example, assume that both hypothesis A and hypothesis B make no prediction about a particular fluid flow. Then the test classifier 262 would deem the fluid flow to be a type III test.

Input from the saved hypotheses data element 99 is provided to a test result payoff generator 266, which, for each possible value of each variable, determines the proportion of hypotheses from the saved hypotheses data element 99 that would be discarded if the variable equaled the particular value. For example, suppose that the saved hypotheses data element 99 contains ten hypotheses and that three of the hypotheses predict that a particular current will be positive or zero, four of the hypotheses predict that the same current will be negative, and the remaining three hypotheses make no prediction about the current. The payoff for a positive current would be four tenths and the payoff for a negative current would be three tenths. The output of the test result payoff generator 266 is stored in a payoff data element 268.

Input from the saved hypotheses data element 99 and from the the component information data element 101 is provided to a hypothesis probability generator 270, which uses empirical component failure rate information from the component information data element 101 to predict the probable validity of each hypothesis from the saved hypotheses data element 99. Output from the hypothesis probability generator 270 is stored in the hypothesis probabilities data element 272.

The hypothesis probabilities data element 272 and the saved hypotheses data element 99 are provided as inputs to a test result probability generator 274, which predicts the expected values that the user will observe for each variable. A value of a variable which is predicted by a hypothesis having a high probability is more likely to be observed than a value of a variable which is predicted by a hypothesis having a low probability. For example, assume that the saved hypotheses data element 99 contains hypothesis A which predicts that a particular fluid flow will be zero and hypothesis B which predicts that the same fluid flow will not be zero. Further assume that hypothesis A is deemed by the hypothesis probability generator 270 to have an eighty percent probability and hypothesis B is deemed by the hypothesis probability generator 270 to have a twenty percent probability. Then the test result probability generator 274 will determine that there is an eighty percent chance that the fluid flow will be observed by the user to be zero and a twenty percent chance that the fluid flow will be observed by the user to be non-zero.

Output from the test result probability generator 274 is stored in an expected probabilities data element 276 which, along with the payoffs data element 268, is provided as input to a test utility generator 278. For each variable, the test utility generator 278 determines the utility of having the user measure that variable by calculating the sum of the products of the expected probability and the payoff for each value that the variable can have. For example, suppose a variable X had three possible values: minus, zero, and plus. Further assume that the payoff for measuring the variable as minus is one tenth, the payoff for measuring the variable as zero is two tenths and the payoff for measuring the variable as plus is six tenths. Also assume that the probability that X is minus is twenty-five percent, the probability that X is zero is seventy percent, and the probability that X is plus is five percent. The utility of measuring the variable X is determined by the following equation:

$$\text{Utility of } X = (0.10 \times 0.25) + (0.20 \times 0.70) + (0.60 \times 0.05)$$

The output of the test utility generator 278 is stored in a test utility data element 280 which, along with data from the component information data element 101, is provided as input to a test score generator 282. The test score generator 282 divides the test utility of each variable by the test time for each variable (from the component information data element 101) in order to provide a test score for each variable which is stored in a test score data element 284. For each of the variables, the test score generator 282 determines the desirability of prompting the user to observe the machine parameter represented by that variable. For two variables having the same utility, the one which takes longer for the user to measure will have a lower test score. Furthermore, some variables, such as the internal frictional force of a mechanical part, may be impossible for the user to measure and will be assigned a test time which approaches infinity. A thorough discussion of theory and computation of utility can be found in Von Neumann, John and Morgenstern, Oskar *Theory of Games and Economic Behavior*, Princeton, Princeton University Press, 3rd edition (1953).

The test scores data element 284 and the classified tests data element 264 are provided as inputs to a test selector 286, which attempts to determine the best observation for the user to perform. The test selector 286 is also provided with a third input from a thresholds data element 288, which contains threshold values for each of the types of tests (for the current embodiment, the threshold for type I tests is 0.5 and the threshold for type II tests is 100). The test selector 286 chooses a type I test (i.e. a user observation guaranteed to eliminate at least one hypothesis from the saved hypotheses data element 99) having the highest test score. However, if the highest scoring type I test has a score less than the threshold for type I tests, then the test selector 286 chooses the highest scoring type II test having a test score higher than the threshold for type II tests. If there are no type I or type II tests having a test score higher than the respective thresholds, the test selector 286 chooses no tests. The output of the test selector 286 is written to the test request data element 102. Note that if the test selector 286 writes nothing to the test request data element 102, the hypothesis generator 105 detects that the test request data element 102 is empty and begins expanding hypotheses from the saved hypotheses data element 99.

Figure 12:
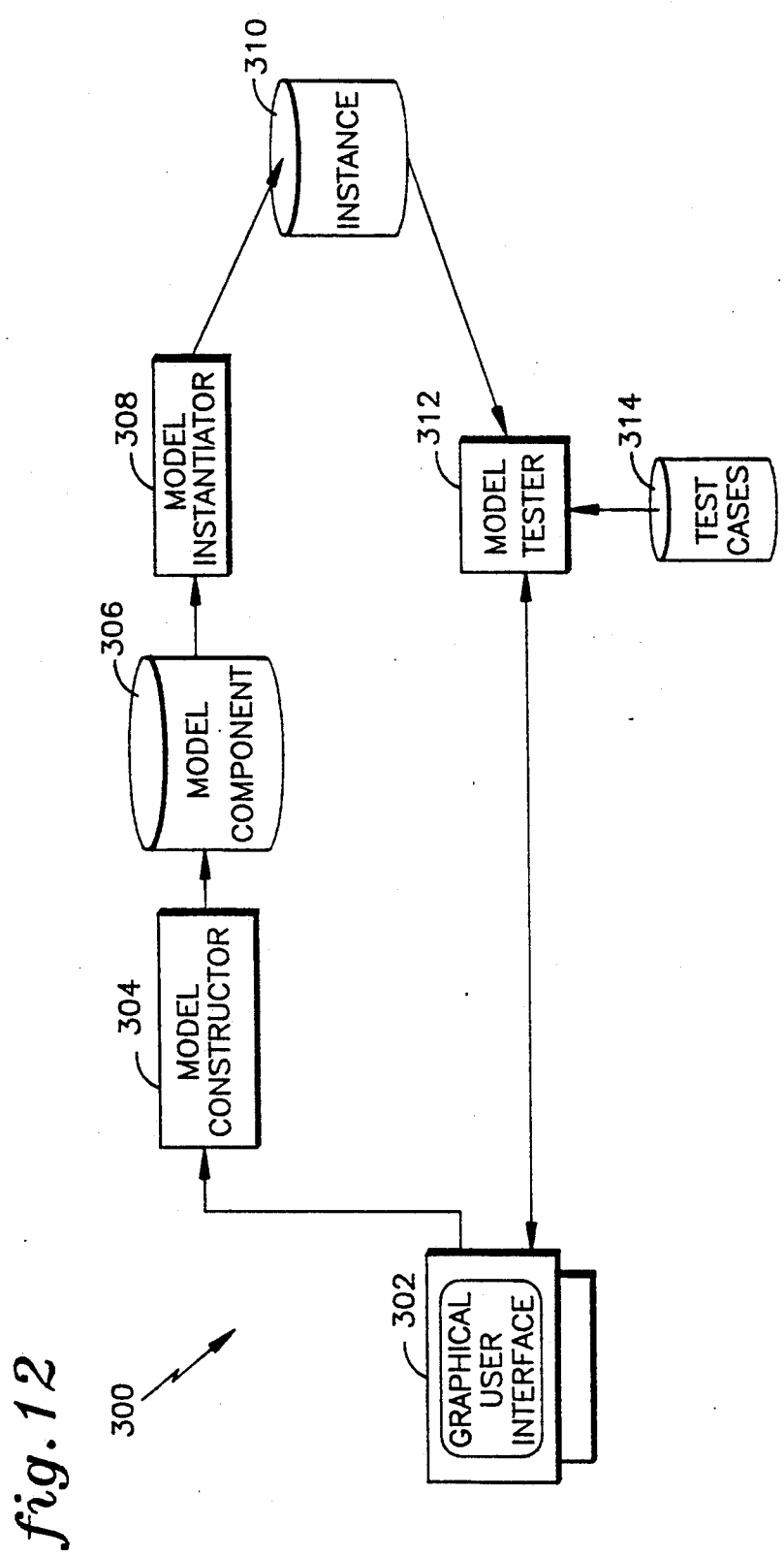
FIG. 12 is a dataflow diagram which illustrates a model builder.

FIG. 12 is a dataflow diagram 300 illustrating a model builder, which produces the model instance data element 106 that is used by the QRS software. The model instance data element 106 is constructed off-line by running the model builder on a computer workstation, such as a Symbolics 3640 manufactured by Symbolics Inc. of Burlington, Mass., and is then transferred to the PMA 30 to become part of the QRS software.

Input to the model builder is through a graphical user interface 302, which is described in detail in "HELIX: A Helicopter Diagnostic System Based on Qualitative Physics", Hamilton, Thomas P., International Journal of Artificial Intelligence in Engineering, Vol. 3, No. Jul. 3, 1988, pp 141-150. User input from the graphical user interface 302 is provided to a model constructor 304, which processes the user input to produce a model component data file 306 to be stored on the disk of the workstation. The model component data file 306 contains definitions of elementary model components (i.e. terminals, variables and confluences of elementary components) and definitions of compound model components, which the user can create by interconnecting elementary components or by interconnecting other compound components. The data stored in the model component data file 306 is in the form of LISP expressions, the construction of which is known to those skilled in the art. The interconnections of the components in the component data file 306 define the model hierarchy so that at the lowest level of the hierarchy are the elementary components and at the highest level of the hierarchy is a single compound component which represents the machine being modeled.

The component data file 306 is provided as an input to a model instantiator 308, which, considering the specifics of model components, parameters, and connections, converts the component data file 306 into a format optimized for processing by the QRS software on the PMA 30. The result of the conversion by the model instantiator 308 is output to an instance data file 310, which is stored on the disk of the workstation and which can be transferred to the QRS software on the PMA to become the model instance data element 106. The conversions performed by the instantiator 308 include conversion of confluences from infix notation to prefix notation, extraction of keywords from conditional confluences, presorting the variables used in each confluence for fast access, and converting the data types of variables from LISP lists of attributes to LISP symbols.

The instantiator 308 also reduces the number of constraints and variables of the model by constraint reduction. Constraint reduction involves examining the confluences of a component and eliminating simple confluences having the form V1 equals V2 or V1 equals $-$V2 where no more than one of the variables is a terminal variable (i.e. describes a condition at the terminal of a component). The other variable may be a terminal or a non-terminal variable. One non-terminal variable and the simple confluence are eliminated by substituting the other variable (or the negation of the other variable in the case of a simple confluence of the form V1 equals $-$V2) for the non-terminal variable in all of the confluences for the component. One restriction is that the possible qualitative values for the non-terminal variable must be a subset of the possible qualitative values for the other variable.

The constraint reduction process begins at the lowest level of the model hierarchy. Variables which are eliminated at the lowest level are also eliminated from higher levels of the hierarchy. At subsequent levels of the hierarchy, it is likely that more variables can be eliminated because variables which describe terminals at one level may not describe terminals of components at a higher level of the model hierarchy. For example, many of the elementary component terminal variables of a power supply become non-terminal variables when the elementary components are grouped together.

For the QRS to operate properly, the instance data file 310 must contain a correct representation of the system which is being modeled. The instance data file 310 is provided as an input to a model tester 312, which interacts with the user via the graphical user interface 302 to exercise components of the instance data file 310. The model tester 312 exercises components by using qualitative physics to detect and diagnose failures or to generate operational states of a component, providing information to the user via the graphical user interface 302. For example, for a valve residing in the instance data file 310, the component tester 312 may generate a first state wherein the valve is closed and the flow out of the valve and the flow into the valve is zero, a second state wherein the valve is open, the flow into the valve is positive, and the flow out of the valve is positive, a third state wherein the valve is open, the flow into the valve is negative and the flow out of the valve is negative, and a fourth state wherein the valve is open, the flow into the valve is zero and the flow out of the valve is also zero.

Generating states allows the user to debug a component model. If the user has provided too many constraints for the component, the model tester 312 will fail to generate all of the possible states for the component. For example, using the valve example from above, if the user erroneously provided too many constraints for the valve, the model tester 312 may have only generated three of the four operational states shown above. Similarly, if the user has provided too few constraints, the model tester 312 may generate extra, illegal states. For example, using the valve example from above, if the user had not provided a constraint for the valve specifying that the flow in and out of the valve is zero when the valve is closed, the model tester 312 may have generated a state wherein the valve is closed and the flow in and flow out of the valve was a positive non-zero value.

The user may also optionally create a test cases data file 314, which is stored on the disk of the workstation. The test cases data file 314 contains predetermined sets of assigned values for variables of components stored in the instance data file 310. For example, the test cases data file 314 may contain a first and second set of assigned variable values for an electrical resistor, wherein for the first set, the current through the resistor is positive and the voltage across the resistor is positive and wherein for the second set the current through the resistor is negative and the voltage across the resistor is also negative. Note that the test cases data file 314 need not contain all of the test cases for a particular component. For the resistor example above, the case wherein the current and voltage for the resistor are zero is not used.

Furthermore, the test cases data file 314 may contain invalid cases, i.e. sets of values for variables of a component which violate the confluences of the component. For example, the test cases data file 314 may contain a case for a resistor wherein the voltage across the resistor is positive and the current through the resistor is negative. The test cases data file 314 is provided as an input to the component tester 312, which substitutes values from the predetermined sets of cases into variables of the component being tested. The component tester 312 reports the result to the user via the user interface 302. A string, which is provided with each case in the test cases data file 314 by the user at creation time, is also reported to the user via the user interface 302 so that, for example, a string for an invalid case would identify the case as such.

Although the QRS software is shown as running on the PMA 30, and model construction is illustrated as running on a Symbolics 3640 workstation, it will be appreciated by those skilled in the art that either the QRS or the model construction can be supported on a variety of computing systems. Similarly, although the QRS software is shown to be written in LISP, the invention may be practiced using any computer language capable of supporting the functionality required. Even though the failure isolation system illustrated herein uses a rule-based system prior to using the QRS, it will be appreciated by those skilled in the art that the QRS may be operated without using the rule-based system at all.

Even though qualitative physics is shown as being used for failure isolation and for model component debugging, it will be appreciated by those skilled in the art that qualitative physics can have many other applications beyond those illustrated herein. The invention can be used for failure isolation of any type of system that can be modeled qualitatively, and is not restricted to machines. Examples of such systems include, but are not limited to, economic systems, inventory systems, and physiological systems. Furthermore, aspects of the invention which relate to improvements to qualitative physics modeling (such as core predictions, dynamic assumption ordering, and confluence caching) have applications beyond those illustrated herein. The constraint propagation aspects of core predictions and dynamic assumption ordering can be used for invalidating inconsistent models (i.e. whenever a variable cannot take on any possible value without resulting in an inconsistent set of predictions). Similarly, qualitative physics modeling can be used for failure isolation without employing core predictions, dynamic assumption ordering, or confluence caching, although the resulting failure isolation system is likely to perform in a degraded manner. Although dynamic assumption ordering is illustrated herein as choosing variables which appear in the greatest number of target confluences for value substitution, it is possible to use a different scheme, such as choosing variables which appear in the second or third greatest number of target confluences, and still derive some of the benefits of dynamic assumption ordering.

The thresholds illustrated herein for the type I and type II tests of the intelligent test selection 100 may be changed. Similarly, the specific formulae used to calculate test scores, or the criteria used therein, may be modified without departing from the spirit and scope of the invention. The intelligent test selection 100 illustrated herein has other applications, beyond failure isolation, such as determining the best measurements for testing a component, and hence the placement of test points on the component, during the design of the component.

The ordering of the assumption of the number of simultaneous component failures illustrated herein (e.g. zero component failures, one component failure, two simultaneous component failures, etc.), and hence the ordering of hypothesis generation, may be modified without departing from the spirit and scope of the invention. Similarly, the step of prompting the user and determining the response whenever the number of components which are assumed to have simultaneously failed is increased, may be eliminated by having the QRS automatically increase the number and continue failure isolation without informing the user. The QRS can operate on a model comprised entirely of elementary components and hence does not require the model, contained in the model instance data element 106, to be hierarchical.

Even though a single application for the model builder is illustrated herein (i.e. using the model builder to construct the model instance data element 106 of the QRS), it will be appreciated by those skilled in the art that the model builder can have many other applications. A process different than the one illustrated herein can be used to create the model instance data element 106. Also, the QRS can operate on model instances wherein only a subset of the optimizations illustrated herein (e.g. constraint reduction, extraction of keywords, converting the data types of variables from LISP lists of attributes to LISP symbols, etc.) are performed on the model by the instantiator 308, but the result is likely to lead to a degradation in performance of the QRS. The QRS can also be configured to operate directly on the component data file 306, but such a system is likely to execute more slowly than the embodiment illustrated herein. The model instance can be tested using methods other than those illustrated herein.

Although the invention is illustrated by having the user make observations, it is possible to automate the observation acquisition process by providing a data connection between the PMA 30 and the machine on which failure isolation is being performed and by having the QRS software request the machine for information via the data connection and by having the machine provide information also via the data connection. Furthermore, the QRS may provide failure isolation without prompting the user for additional observations if, upon initialization with observations from the rule based system, the observations data element 94 contains a sufficient amount of information to isolate a machine failure to a single elementary component. Also, it is possible to provide failure isolation without the intelligent test selection 100 by using other methods (including random selection) to determine which observation to perform, but the result is likely to cause the QRS to take a longer amount of time to isolate a machine failure.

Although the invention has been shown and described with respect to exemplary embodiments thereof, it should be understood by those skilled in the art that various changes, omissions and additions may be made therein and thereto, without departing from the spirit and the scope of the invention.

I claim:

1. A method of using a processor for analyzing machine signals to determine the presence of particular machine faults, comprising the steps of:

the processor receiving signals indicative of values of machine parameters;

the processor generating a plurality of pending hypotheses wherein each hypotheses has associated therewith a set of confluences describing operation of components of the machine which are assumed not to have failed, said confluence being provided by a model instance data element;

the processor propagating values indicative of said machine signals through said confluences to produce a set of predictions for values of confluence variables of a particular one of said hypotheses by temporarily assigning a constant value to a variable of said particular hypothesis, said constant value being from a list of possible values for said variable, propagating said constant value through confluences of said hypothesis in order to detect inconsistencies, iteratively assigning and propagating all possible constant values for said variable, and permanently assigning a particular one of said constant values to said variable if only said particular one of said constant values results in a consistent set of predictions for said hypothesis;

the processor discarding hypotheses which produce an inconsistent set of predictions;

the processor saving hypotheses which produce a consistent set of predictions; and the processor indicating the presence of one or more particular machine faults in response to there remaining a single hypothesis corresponding to failure of one or more particular machine components.

2. A method of using a processor for analyzing machine signals to determine the presence of particular machine faults, comprising the steps of:

the processor receiving signals indicative of values of machine parameters;

the processor generating a plurality of pending hypotheses wherein each hypotheses has associated therewith a set of confluences describing operation of components of the machine which are assumed not to have failed, said confluence being provided by a model instance data element;

the processor propagating values indicative of said machine signals through said confluences to produce a set of predictions for values of confluence variables;

the processor discarding hypotheses which produced an inconsistent set of predictions by temporarily assigning a constant value to a variable of a particular one of said hypotheses, said constant value being from a list of possible values for said variable, propagating said constant value through equations of said particular hypothesis in order to detect inconsistencies, iteratively assigning and propagating all possible constant values for said variable, and discarding said hypothesis if no constant values for said variable result in a consistent set of predictions for said hypothesis;

the processor saving hypotheses which produce a consistent set of predictions; and the processor indicating the presence of one or more particular machine faults in response to there remaining a single hypothesis corresponding to failure of one or more particular machine component.

* * * * *